HIRAM W. HAYDEN.
IMPROVEMENTS IN LAMPS.
PATENTED
JAN 21 1868
73600   FIG.1.   FIG.2.
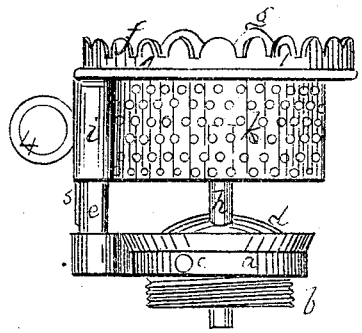
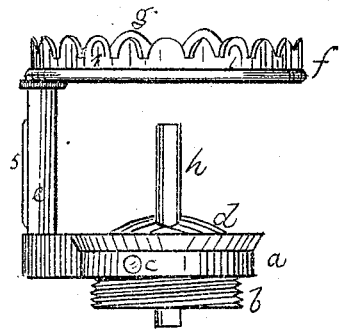
FIG.3.   FIG.4.
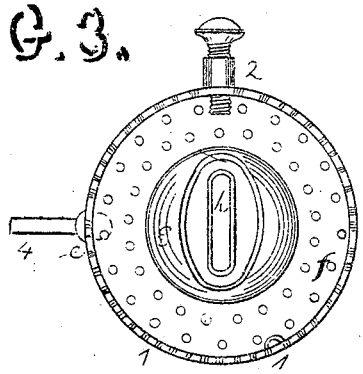
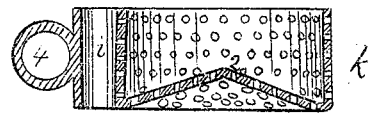
FIG.5.
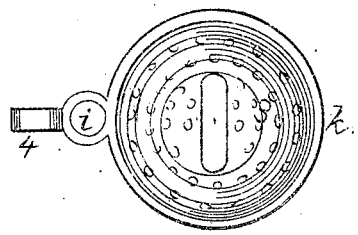
WITNESSES.
Louis D. Griggs
Chs. T. Miller
WATERBURY CONN. MAY 11th 1867.
Hiram W. Hayden

UNITED STATES PATENT OFFICE.

HIRAM W. HAYDEN, OF WATERBURY, CONNECTICUT.

IMPROVEMENT IN LAMPS.

Specification forming part of Letters Patent No. 73,600, dated January 21, 1868.

*To all whom it may concern:*

Be it known that I, HIRAM W. HAYDEN, of Waterbury, in the county of New Haven and State of Connecticut, have invented, made, and applied to use a certain new and useful Improvement in Lamps; and I do hereby declare the following to be a full, clear, and exact description of the said invention, reference being had to the annexed drawings, making part of this specification, wherein—

Figure 1 is an elevation of said burner complete. Fig. 2 is a similar view with the sliding perforated cup removed. Fig. 3 is a plan of the burner. Fig. 4 is a section, and Fig. 5 is a plan of the perforated cup separately.

Similar marks of reference denote the same parts.

Heretofore lamps have been made with the chimney-holder supported by a slide, so that the same can be raised for lighting the wick or for trimming it. This, however, left the chimney-holder loose and liable to shake in moving the lamp from place to place. A lamp has been made with a stationary chimney-holder and a sliding perforated ring that gave access to the wick for lighting it; but there was no opportunity for introducing scissors for trimming the wick.

The nature of my said invention consists in a chimney-holder that is permanently connected to the burner and provided with a deflector over the wick-tube, so constructed that access is given below such deflector for trimming the wick, and I combine therewith a sliding perforated cup that prevents the flame being affected by passing currents of air, but allows access to the wick for trimming when the said cup is moved down to the burner-shell. This construction also aids in keeping the reservoir cool, and prevents the possibility of explosion, because the lower part of the wick-tube when the burner is lighted is not covered up, but is cooled by the external air, and any pieces of carbon from the wick are caught in the cup, and the flame will not pass through the fine perforations.

In the drawings, $a$ is the burner-shell, with the screw $b$, to take the ring of the reservoir, the wick-raiser $c$, and ratchet-cap $d$, of any desired size or character.

$e$ is a stud, attached at the lower end to the shell $a$ and at the upper end to the chimney-holder $f$, that is formed with the usual lips, 1 1, and clamping-screw 2; and $g$ is the dome-shaped deflector, made sufficiently short to allow the upper end of the wick-tube $h$ to be below the under side of the chimney-holder $f$ and give easy access for trimming the wick, and at the same time maintain the proper distance between the wick-tube and the slots in the deflector $g$ to cause the proper action of the air on the flame. More than one stud $e$ may be employed, if desired.

$k$ is my perforated cup, formed with a perforated bottom, 3, in which is a slot fitting the wick-tube $h$. At one side of the cup $k$ is a pipe, $i$, to set over and slide upon the stud $e$, and a small ring or handle, 4, enables this cup to be slid up or down.

A small spring may be let into the stud $e$, as at 5, to prevent the cup $k$ falling down to the shell $a$ while the lamp is being used.

The cup $k$ may be moved down, and the light will not smoke except when exposed to currents of air, and in this form may be used with a small flame, as a night-lamp, the flame being visible, and but little shadow is cast around the lamp while burning if the cup $k$ is slid down.

The combustion in this lamp is very perfect, so that the chimney is not as quickly soiled as usual. There is but little risk of the chimney being broken, it is so seldom removed from the lamp, and in case the lamp smokes from the wick not being properly cut the difficulty can be rectified while the lamp is being burned, the sliding perforated cylinder giving access for so doing.

What I claim, and desire to secure by Letters Patent, is—

1. A chimney-holder connected permanently to the burner-shell and provided with short deflector, in combination with a stationary wick-tube, and arranged, as set forth, so that access is given below the chimney-holder for trimming the wick, as set forth.

2. A sliding perforated cup having a bottom with a slot for the wick-tube, and applied between the burner-shell and chimney-holder, substantially as set forth.

3. The perforated cup *k*, stud *e*, deflector *g*, and chimney-holder *f*, in combination with the burner and wick-tube *h*, substantially as and for the purposes set forth.

4. A friction-spring, in combination with the perforated cup *k*, for sustaining the same at any point to which it may be moved, as set forth.

In witness whereof I have hereunto set my signature this 11th day of May, A. D. 1867.

H. W. HAYDEN.

Witnesses:
　　LOUIS D. GRIGGS,
　　CHAS. W. GILLETTE.